Nov. 11, 1969    W. E. MARTIN    3,477,246
SHAFT COUPLING
Filed Jan. 10, 1968

INVENTOR.
WILLIAM E. MARTIN
BY *William A. Murray*
ATTORNEY

United States Patent Office 3,477,246
Patented Nov. 11, 1969

3,477,246
SHAFT COUPLING
William E. Martin, P.O. Box 187,
Kewanee, Ill. 61443
Filed Jan. 10, 1968, Ser. No. 696,851
Int. Cl. F16d 3/52
U.S. Cl. 64—11                                       14 Claims

ABSTRACT OF THE DISCLOSURE

A coupling for effecting a driving connection between adjacent ends of a pair of axially aligned shafts comprising: first and second coupler members fixed to rotate with the respective shafts and having radial faces facing one another across an axial gap between the members and further having aligned holes extending lengthwise of the shaft and spaced radially from the axis of the shafts; bolts disposed in the holes and extending across the gap for connecting the first and second members and having adjustable nuts thereon for adjusting the gap between the members; rubber bushings within the holes about the bolt shanks; and an elastomer or rubber spacer between the members and in the gap between the members, the spacer being an annulus formed about the axis of the shafts.

BACKGROUND OF THE INVENTION

Field of the invention

This invention relates to a flexible coupling for connecting adjacent ends of two axially aligned shafts. More particularly the invention relates to the disposition of and shapes of resilient elements and their relation to rigid connecting parts utilized to couple the two shafts.

Description of the prior art

In U.S. Patent 2,879,650, which issued to the present inventor Mar. 31, 1959, there is shown and described a structure for flexibly coupling two shafts that utilizes a metal intermediate coupler plate between two radial flanges of a conventional rigid shaft coupler. Each of the flanges is independently connected to the intermediate plate by bolts encased in rubber in the plate. Consequently each of the flanges is connected to the plate by means that permits a degree of resiliency. While there have been other forms of flexible couplings, the above is one of many now on the market.

A problem that exists with the above type of couplings is that often space is not available to insert an intermediate plate between the flanges. This is particularly true in locations where it is desired to replace a conventional rigid coupling with a flexible coupling. Also, the above coupling as well as most flexible couplings is utilized primarily in locations where the shafts are moving or vibrating radially in respect to one another. Generally there is little or no provision for accommodating vibrations in axial directions between the adjoining shafts.

SUMMARY

With the above in mind, it is the primary purpose of the present invention to provide a flexible coupling that includes a pair of radial metal flanges fixed to the respective shafts that have opposed radial faces spaced axially apart to provide a gap therebetween. Provided in the gap is an elastomer or rubber annulus. The flanges have aligned openings for receiving bolts that interconnect the flanges and which may be tightened to compress the annulus. The openings in the flanges receiving the bolts are conical shaped. Conical shaped elastomer or rubber bushings are seated in the openings to resiliently suspend the bolts in the openings. The radial surfaces of the flanges have annular grooves recessed therein for receiving opposite sides of the annulus and retain it in proper relation to the flanges and in the gap between the flanges. Thus, when the bolts and nuts are drawn together, the bolts are encased in rubber and the two flanges are joined by the then compressed rubber annulus.

DESCRIPTION OF THE PREFERRED EMBODIMENTS

Figure 1:
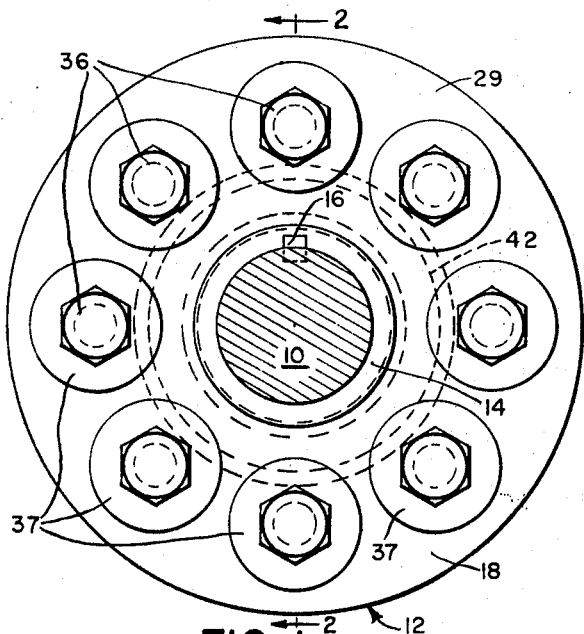
FIG. 1 is an end view of the coupling and a supporting shaft.

The coupling of the present invention is situated to drivingly connect a pair of substantially axially aligned shafts 10, 11 and is composed in part of a pair of coupler members 12, 13 having internal hub portions 14, 15 keyed or fixed at 16, 17 to rotate with the respective shafts 10, 11. The coupler members 12, 13 have radial flanges 18, 19 with opposed radial faces 20, 21 facing one another across an axial gap 22. Provided in the flanges 18, 19 are annular rows of openings or holes 23, 24 that are aligned with one another across the gap 22. The respective holes 23, 24 are radially spaced from the shafts and extend parallel to or longitudinally in respect to the shafts 10, 11. The holes 23, 24 include small portions 25, 26 respectively extending from the respective faces or surfaces 20, 21 and continue into tapered or conical shaped portions 27, 28 respectively that open to the respective radial surfaces 29, 30 on the sides of the flanges opposite the surfaces 20, 21.

Retained within the enlarged conical portions 27, 28 are resilient bushings 31, 32 of elastomer material. While the elastomer material in the present instance is rubber it should be understood the term elastomer is meant to include all compounds, pastics, rubber and otherwise that have a resiliency to deform and reshape. The bushings 31, 32 have conical shaped ends residing in the conical portions 27, 28 and projecting ends 33, 34 extending outwardly of the respective radial surfaces 29, 30.

Extending through the bushings 31, 32 and the openings 23, 24 are elongated threaded elements or bolts 35. The shanks of the bolts 35 are smaller than the small portions 25, 26 of the openings 23, 24 to permit some play or movement of the bolts. Each bolt 35 has a conventional head 36 bearing against a washer 37 which in turn bears against the projecting end 33 of bushing 31. The threaded end 38 of each bolt 35 receives a threaded nut means 50 that bears against a washer 39, which in turn bears against the projecting end 34 of bushing 32.

Recessed in the surfaces 20, 21 is a pair of annular grooves 40, 41 formed about the shafts 10, 11 and facing one another across the gap 22. The grooves 40, 41 are trapezoidal in cross section with the wider parts of the respective grooves opening into the surfaces 20, 21.

Retained in the grooves 40, 41 is an elastomer or rubber annulus 42. The annular 42 has in cross section opposite trapazoidal shaped end or edge portions 43, 44 that rest in the grooves 40, 41 and a central integral joining portion 5 that spans the gap 22 between the flanges. When the entire coupling is in a general relaxed condition, as shown in FIG. 2, small openings or gaps 46, 47 exist between the edge or end portions 43, 44 of the annulus and the base of the grooves 40, 41.

Figure 2:
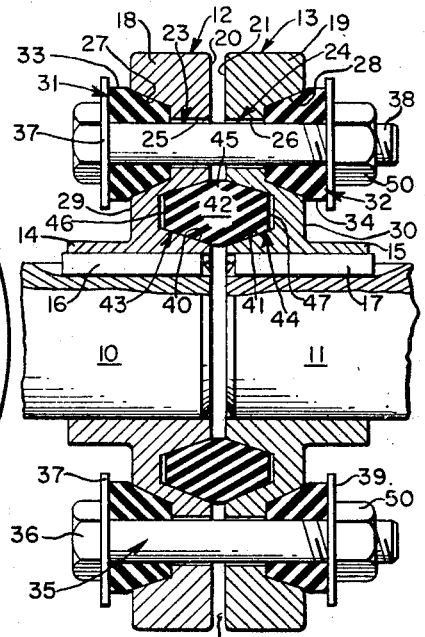
FIG. 2 is a vertical sectional view of the coupling and shafts taken along line 2—2 of FIG. 1.
Figure 3:
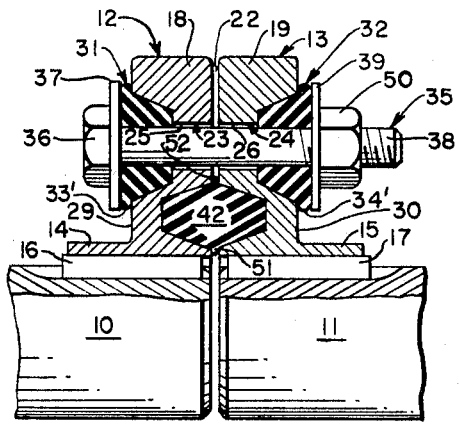
FIG. 3 is a sectional siew similar to FIG. 2 and showing the coupling in an operating condition.

The entire coupling device is shown in the assembled but untightened condition in FIG. 2. Referring now to FIG. 3, the nuts 50 are tightened which forces the conical surfaces of the bushings 31, 32 to bear tightly against the conical surface of the opening portions 27, 28. At the same time the projecting portions 33, 34 of bushings 31, 32 are deformed into beads 33', 34' (FIG. 3) that are sandwiched between the washer 37 and surface 29 and the washer 39 and surface 30 respectively.

Tightening of the nuts 30 will also force the end portions 43, 44 of the annulus to completely fill the grooves 40, 41 and will cause the central portion to deform so as to form inner and outer annular beads 51, 52 that span the then narrowed gap 22.

It will thus be seen that the interconnecting bolts or elements 35 are entirely suspended in the couplers 12, 13 by the resilient bushings 31, 32 and no portion of the metal interconnecting parts, whether it be the bolts or one of its washers 37, 39, is ever in direct contact with the flanges 18, 19. The resilient annulus 42 will also deform to accommodate slight misalignment of the shafts 10, 11, vibration between the shafts, or relative axial movement or vibration between the shafts. Therefore, the annulus further serves to prevent transfer of vibration between the shafts or to create vibration in the driven shaft due to any misalignment between the shafts.

Annulus 42 serves to transmit torque resiliently between flanges 18, 19. The grooves 40, 41 are shaped so that compression of the annulus 42 in the grooves produces traction between the sides of the annulus 42 and the grooves. This prevents slipping, thereby forcing torque between the two flanges to be absorbed by the resilient elements 42. The degree in which the nuts 50 are drawn or tightened will affect the resultant resiliency and yieldability of the annulus 42 and bushings 31, 32. The annulus 42 and elastomer bushings 31, 32 allow distortion of the alignment of the flanges in all directions under stress and causes return of the flanges to normal alignment upon removal of the stress. Therefore, there is limited relative flexing permitted between the respective flanges.

Figure 4:
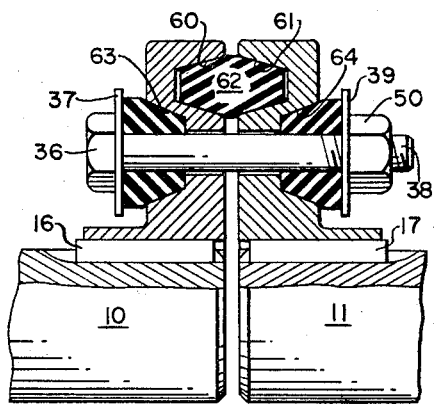
FIGS. 4 and 5 are figures similar to the top half portion of FIG. 2 but showing modified forms of the invention.

In the first form of the invention, as shown in FIGS. 1–3, the annular row of bolts 35 and their openings 23, 24 are radially outwardly of the annulus 42 and the annular grooves 40, 41. In the form of the invention shown in FIG. 4 the reverse is true and there is provided annular grooves 60, 61, similar in cross section to the grooves 40, 41 receiving a resilient torque transmitting annulus 62, similar in composition and in cross section to the annulus 42. Also provided are identical bolts 35, washers 37, 39 and nuts 50 that extend through an annular row of bushings 31, 32 and openings 63, the latter being identical in cross section to the openings 27, 28, that are radially inwardly of the annulus 62 and the grooves 60, 61. This form of the invention may be used in most of the same drives as the previous form although space limitations as well as operational characteristics may dictate the use of one form over the other.

Figure 5:
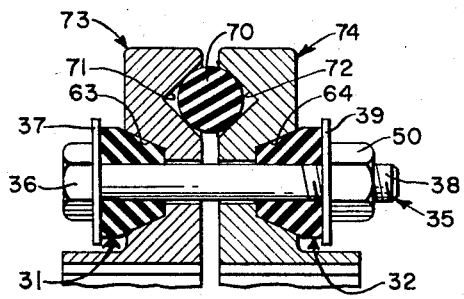

Referring now to FIG. 5, a further modified form is shown and includes the use of an elastomer torque transmitting annulus 70 having a round cross section. Provided in the opposed surfaces of the radial flanges of coupler members 73, 74 is a pair of annular grooves 71, 72 that receive opposite sides of the annulus 70. The grooves 71, 72 are V-shaped in cross section. As the bolts are drawn by the nuts, the annulus will deform and contact the sides of the wall of the grooves 71, 72 to thereby frictionally hold the sides of the annulus rigidly against the walls and to form inner and outer annular beads between the surfaces. As in the previous forms of the invention the annulus 70 serves to transmit torque between the flanges 73, 74. The beads and the portion of the annulus between the surfaces serve as a spacer to preserve the gap between the flanges. The construction and assembling of the coupler device is obvious in view of the previous descriptions concerning the other forms of the invention.

What is claimed is:

1. A coupling for effecting a driving connection between adjacent ends of a pair of axially aligned shafts comprising first and second coupler members fixed to rotate with the respective shafts and having radial faces facing one another across an axial gap between the members, with at least one of said faces having an annular recess therein, said members further having aligned holes extending lengthwise of the shafts and spaced radially from the axis of the shafts; interconnecting elements disposed in the holes and extending across the gap for connecting the first and second members and adjustable to affect the width of the gap between the members; elastomer bushing elements within the holes and about the interconnecting elements; and an elastomer spacer seated in the annular recess and extending across the gap between the members.

2. The structure as set forth in claim 1 in which both faces have annular recesses across the gap from one another and the spacer is an annulus with opposite sides seated in the respective recesses.

3. The structure as set forth in claim 2 in which the recesses are trapezoidal in cross section whereby as the sides of the spacer are compressed into the recesses they will tightly wedge against the surfaces of the recesses.

4. The structure as set forth in claim 3 in which the spacer has opposite trapezoidal shaped sides that are received in the trapezoidal shaped recesses and a central interjoining portion that expands the gap between the faces.

5. The structure as set forth in claim 1 in which the interconnecting elements are disposed in an annular row about the shaft axis and the annular recess is radially outwardly of the row.

6. The structure as set forth in claim 1 in which the interconnecting elements are disposed in an annular row about the shaft axis and the annular recess is radially inwardly of the row.

7. The structure as set forth in claim 1 in which the spacer is round in cross section and rests partially in the recess.

8. The structure as set forth in claim 1 further characterized by the interconnecting elements being bolts and the holes of both coupler members are larger that the bolts to thereby loosely receive them and are at least partially frusto-conical shaped; and the bushings are frusto-conical shaped to seat in the frusto-conical shaped portion and are of such length to project outwardly of the respective coupler members, and the interconnecting elements are adjustable by threaded means that cause the bolts to be reduced in effective length to thereby compress the bushings.

9. A flexible coupling for effecting a driving connection between adjacent ends of a pair of axially aligned shafts comprising: first and second coupler members fixed to rotate with the respective shafts and having radial flange portions with opposed radial faces facing one another across an axial gap, the flanges further having aligned openings spaced radially from the shaft axis and extending lengthwise of the shafts, the openings in the respective flanges having small portions extending away from the respective faces and continuing tapered portions extending to the opposite surfaces of the respective flanges; tapered elastomer bushings seated in the tapered portions of the openings and adapted to frictionally and tightly engage the tapered sides of the tapered portions; elongated threaded elements supported in the bushings of aligned openings in the flanges with associated threaded means for adjusting the resiliency of the bushings; and elastomer spacer means between and engaging the opposed faces of the flanges in annular disposition and radially spaced in respect to the shafts.

10. The structure as set forth in claim 9 in which the small portions of the respective openings are larger than the threaded elements whereby the threaded elements are resiliently suspended on the flanges by the elastomer bushings.

11. The structure as set forth in claim 10 further characterized by the bushings having projecting portions extending outwardly of the respective opposite surfaces, the threaded elements are bolts with each of the head ends adapted to compress the projecting portion in one flange, and the threaded means are nuts with each nut being adapted to compress the projecting portion in the flange opposite the flange carrying the respective head end, and whereby the projecting portions will form a resilient cushion between the head ends and nuts and the respective opposite surfaces of the flanges.

12. The structure as set forth in claim 11 in which the radial face of a respective flange has a recessed annular groove and the spacer is an elastomer annulus seated in the groove.

13. A coupling for effecting a driving connection between adjacent ends of a pair of axially aligned shafts comprising first and second coupler members fixed to rotate with the respective shafts and having radial faces facing one another across an axial gap between the members, each of said faces having an annular groove aligned with the other across the gap; a torque transmitting elastomer annulus seated in the respective grooves and spanning the gap; and interconnecting elements extending between and for connecting the first and second members and adjustable to compress the annulus.

14. A coupling for effecting a driving connection between adjacent ends of a pair of axially aligned shafts comprising: first and second coupler members fixed to rotate with the respective shafts and having radial flange portions with opposed radial faces facing one another across an axial gap with at least one of said faces having an annular recess therein concentric with its shaft, the flanges further having aligned openings spaced radially from the shaft axis and extending lengthwise of the shafts; an elastomer annulus seated in the recess engaging both of said radial surfaces; elastomer bushings in the openings and adapted to engage the walls of the openings; and elongated threaded elements supported in the bushings of aligned openings in the flanges with associated threaded means for compressing the bushings and annulus to thereby affect the resiliency of the bushings.

References Cited

UNITED STATES PATENTS

| | | | |
|---|---|---|---|
| 2,067,284 | 1/1937 | Pearce | 64—11 |
| 2,140,255 | 12/1938 | Rieske | 64—27 |
| 2,326,451 | 8/1943 | Fawick | 64—11 |
| 2,879,650 | 3/1959 | Martin | 64—10 |
| 2,972,240 | 2/1961 | Wood | 64—11 |
| 3,199,315 | 8/1965 | Morse | 64—27 |

HALL C. COE, Primary Examiner